(12) United States Patent
Balasubramaniam et al.

(10) Patent No.: US 12,361,031 B1
(45) Date of Patent: Jul. 15, 2025

(54) MACHINE LEARNING BASED DATA STRUCTURING SYSTEM AND METHOD FOR AUTOMATING A DIMENSIONAL DATA MODELLING PROCESS IN DATA REPOSITORIES

(71) Applicant: TESSER INSIGHTS INC, Cumming, GA (US)

(72) Inventors: Sundararajan Balasubramaniam, Cumming, GA (US); Gayatri Mohan, Bangalore (IN); Sriranjani Sridharan, Bangalore (IN)

(73) Assignee: TESSER INSIGHTS INC, Cumming, GA (US)

( * ) Notice: Subject to any disclaimer, the term of this patent is extended or adjusted under 35 U.S.C. 154(b) by 0 days.

(21) Appl. No.: 18/642,942

(22) Filed: Apr. 23, 2024

(51) Int. Cl.
*G06F 16/00* (2019.01)
*G06F 16/2455* (2019.01)
*G06F 16/28* (2019.01)

(52) U.S. Cl.
CPC ........ *G06F 16/285* (2019.01); *G06F 16/2455* (2019.01); *G06F 16/283* (2019.01)

(58) Field of Classification Search
None
See application file for complete search history.

(56) References Cited

U.S. PATENT DOCUMENTS

| | | | | |
|---|---|---|---|---|
| 2014/0279674 A1* | 9/2014 | Michels | ................ | H04W 16/24 705/347 |
| 2017/0091692 A1* | 3/2017 | Guo | ..................... | G06V 10/761 |
| 2020/0349128 A1* | 11/2020 | Portisch | ................ | G06F 16/212 |

(Continued)

FOREIGN PATENT DOCUMENTS

EP  1473640 A2  11/2004

OTHER PUBLICATIONS

Astera; The Essential Toolkit for Automated Data Warehousing; 2022; https://www.astera.com/wp-content/uploads/2022/06/Essential-Toolkit-Finale.pdf.

(Continued)

*Primary Examiner* — Anhtai V Tran

(74) *Attorney, Agent, or Firm* — Jason C. Cameron

(57) ABSTRACT

A machine learning based data structuring method for automating dimensional data modelling process in data repositories is disclosed. The ML-based data structuring method includes obtaining datasets from databases; classifying the data comprising attributes and measures based on historical data using a ML-based classifier model; determining associations between the datasets using primary and foreign keys, SQL logs, usage of the datasets in creating transformations, and performance of fuzzy string match; assigning weightages to the determined associations between the datasets based on utilization of the determined associations using weighted network graphs; validating the determined associations between the datasets based on recurrent utilization of the determined associations; clustering the datasets based on the validated associations between the datasets by detecting dimensional models in the weighted network graphs; and generating actionable insights on each of the clustered datasets by performing exploratory data analysis, influencer analytics, and forecasting of the data.

20 Claims, 7 Drawing Sheets

(56) References Cited

U.S. PATENT DOCUMENTS

2021/0133189 A1    5/2021  Prado et al.
2024/0205303 A1*   6/2024  Oleinikov ............. H04L 67/125

OTHER PUBLICATIONS

Grace Fan et.al; Semantics-aware Dataset Discovery from Data Lakes with Contextualized Column-based Representation Learning; Jan. 15, 2023; https://arxiv.org/pdf/2210.01922.pdf.
IBM; Identify the dimensions; Mar. 8, 2021; https://www.ibm.com/docs/en/ida/9.1?topic=phase-step-identify-dimensions.

* cited by examiner

MACHINE LEARNING BASED DATA STRUCTURING SYSTEM AND METHOD FOR AUTOMATING A DIMENSIONAL DATA MODELLING PROCESS IN DATA REPOSITORIES

FIELD OF INVENTION

Embodiments of the present disclosure relate to machine learning based (ML-based) systems, and more particularly relates to a machine learning based (ML-based) data structuring method and system for automating a dimensional data modelling process in data repositories.

BACKGROUND

Efficient data analysis hinges on capacity to segment and explore data in multiple ways, navigating through different levels of detail and across various hierarchies. Dimensional data modeling facilitates the data analysis by organizing data into dimensions and metrics (referred to as facts), and by defining the attributes and hierarchies within each dimension. This approach enables analysts to dissect and understand the data from different perspectives, enhancing the depth and breadth of insights derived from the analysis.

Generally, the dimensional data modeling is a technique used in data warehousing to structure and organize data for analysis and reporting purposes. The dimensional data modeling is especially well-suited for online analytical processing (OLAP) applications where users need to analyze large volumes of data quickly. The dimensional data modeling focuses on designing data models that are optimized for querying and reporting.

Typically, the dimensional data modeling has been a manual process involving initial data analysis to discern different dimensions and metrics. Subsequently, hierarchies for attributes are crafted, and relationships between dimensions and metrics are established. Certain tools streamline this process by examining column name similarities or leveraging database-provided information to detect primary key/foreign key relationships, thereby facilitating the establishment of connections between dimensions and metrics or among dimensions themselves.

The dimensional data modeling necessitates a deep understanding of business context and extensive data analysis to unravel the relationships between datasets. Traditionally, this process is predominantly manual and may be time-consuming. Further, any modifications to the data structures of current datasets or the incorporation of new datasets necessitate adjustments to the model, which again entails a manual process.

Hence, there is a need for an improved machine learning based (ML-based) data structuring system and method for automating dimensional data modelling process in data repositories, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a machine-learning based (ML-based) data structuring method for automating a dimensional data modelling process in one or more data repositories, is disclosed. The machine-learning based (ML-based) data structuring method comprises obtaining, by one or more hardware processors, one or more datasets from one or more databases. The one or more datasets comprise the one or more data associated with one or more users.

The machine learning-based (ML-based) data structuring method further comprises labelling, by the one or more hardware processors, the one or more data within the one or more datasets based on importance of the one or more data for analyzing the one or more datasets. The machine learning-based (ML-based) data structuring method further comprises classifying, by the one or more hardware processors, the one or more data comprising one or more attributes and one or more measures, in the one or more datasets, based on one or more historical data associated with the one or more data using a machine-learning based classifier model.

The machine learning-based (ML-based) data structuring method further comprises determining, by the one or more hardware processors, one or more associations between the one or more datasets based on at least one of: primary and foreign keys defined in one or more source databases, one or more structured query language (SQL) logs, usage of the one or more datasets in creating transformations in a machine-learning based data structuring system, and performance of fuzzy string match of the one or more datasets.

The machine learning-based (ML-based) data structuring method further comprises assigning, by the one or more hardware processors, one or more weightages to the determined one or more associations between the one or more datasets based on utilization of the determined one or more associations between the one or more datasets using the one or more weighted network graphs. The machine learning-based (ML-based) data structuring method further comprises validating, by the one or more hardware processors, the determined one or more associations between the one or more datasets based on recurrent utilization of the determined one or more associations between the one or more datasets. The recurrent utilization of the determined one or more associations between the one or more datasets comprises an optimum weightage.

The machine learning-based (ML-based) data structuring method further comprises clustering, by the one or more hardware processors, the one or more datasets based on the validated one or more associations between the one or more datasets by detecting one or more dimensional models in the one or more weighted network graphs. The machine learning-based (ML-based) data structuring method further comprises generating, by the one or more hardware processors, one or more actionable insights on each of the clustered one or more datasets by performing at least one of: exploratory data analysis, influencer analytics, and forecasting of the one or more data. The machine learning-based (ML-based) data structuring method further comprises outputting, by the one or more hardware processors, the generated one or more actionable insights on each of the clustered one or more datasets, to one or more user interfaces of one or more electronic devices associated with the one or more users.

In an embodiment, classifying, by the machine-learning based classifier model, the one or more data comprising the one or more attributes and the one or more measures, in the one or more datasets, based on the one or more historical data, comprises: (a) obtaining, by the one or more hardware processors, the one or more data comprising the one or more attributes and the one or more measures, from the one or more databases; (b) comparing, by the one or more hardware processors, the one or more data comprising the one or more attributes and the one or more measures, in the one or more datasets, with the one or more historical data associated with the one or more data, wherein the one or more historical data comprise one or more pre-trained classified data associated with the one or more data; and (c) classifying, by the one or more hardware processors, the one or more data comprising the one or more attributes and the one or more measures, in the one or more datasets, based on the comparison of the one or more data with the one or more historical data comprising the one or more pre-trained classified data.

In another embodiment, the machine learning-based (ML-based) data structuring method further comprises training, by the one or more hardware processors, the machine-learning based classifier model on the one or more historical data. Training the machine-learning based classifier model on the one or more historical data comprises: (a) identifying, by the one or more hardware processors, one or more variables required to determine the one or more data comprising the one or more attributes and the one or more measures, wherein the one or more variables comprise at least one of: type, uniqueness, and cardinality, of the one or more data, (b) providing, by the one or more hardware processors, the one or more historical data into the machine-learning based classifier model upon labelling the one or more historical data as the one or more attributes and the one or more measures, (c) training, by the one or more hardware processors, the machine-learning based classifier model by adapting the machine-learning based classifier model to automatically define one or more rules on the identified one or more variables for labelling the one or more historical data as the one or more attributes and the one or more measures, and (d) classifying, by the one or more hardware processors, the one or more data comprising the one or more attributes and the one or more measures using the trained machine-learning based classifier model.

In yet another embodiment, assigning the one or more weightages to the determined one or more associations between the one or more datasets, comprises: (a) storing, by the one or more hardware processors, the determined one or more associations between the one or more datasets in the one or more weighted network graphs, wherein the one or more weighted network graphs comprise one or more pre-stored associations between the one or more datasets being assigned with one or more pre-stored weightages; (b) correlating, by the one or more hardware processors, the determined one or more associations between the one or more datasets, with the one or more pre-stored associations being assigned with the one or more pre-stored weightages in the weighted network graphs; and (c) assigning, by the one or more hardware processors, the one or more weightages to the determined one or more associations between the one or more datasets based on the correlation of the determined one or more associations between the one or more datasets, with the one or more pre-stored associations being assigned with the one or more pre-stored weightages in the weighted network graphs.

In yet another embodiment, the one or more datasets are clustered based on the one or more dimensional models comprising at least one of: star-schema dimensional model and snow-flaked-schema dimensional model, detected in the one or more pre-stored weightages.

In yet another embodiment, the labelling of the one or more data is changed based on the importance of the one or more data by validating the labelling of the one or more data.

In yet another embodiment, the machine learning-based (ML-based) data structuring method further comprises: (a) learning, by the machine-learning based classifier model, the changes in the labelling of the one or more data as one or more feedbacks received from a data labelling subsystem; and (b) classifying, by the machine-learning based classifier model, the one or more data comprising the one or more attributes and the one or more measures, in the one or more datasets, based on the one or more feedbacks corresponding to the changes in the labelling of the one or more data.

In one aspect, a machine learning-based (ML-based) data structuring system for automating a dimensional data modelling process in one or more data repositories, is disclosed. The machine learning-based (ML-based) data structuring system includes one or more hardware processors and a memory coupled to the one or more hardware processors. The memory includes a plurality of subsystems in the form of programmable instructions executable by the one or more hardware processors.

The plurality of subsystems comprises a data obtaining subsystem configured to obtain one or more datasets from one or more databases. The one or more datasets comprise the one or more data associated with one or more users.

The plurality of subsystems further comprises a data labelling subsystem configured to label the one or more data within the one or more datasets based on importance of the one or more data for analyzing the one or more datasets.

The plurality of subsystems further comprises a data classification subsystem configured to classify the one or more data comprising one or more attributes and one or more measures, in the one or more datasets, based on one or more historical data associated with the one or more data using a machine-learning based classifier model.

The plurality of subsystems further comprises an association determining subsystem configured to determine one or more associations between the one or more datasets based on at least one of: primary and foreign keys defined in one or more source databases, one or more structured query language (SQL) logs, usage of the one or more datasets in creating transformations in a machine-learning based data structuring system, and performance of fuzzy string match of the one or more datasets.

The plurality of subsystems further comprises a weightage subsystem configured to assign one or more weightages to the determined one or more associations between the one or more datasets based on utilization of the determined one or more associations between the one or more datasets using the one or more weighted network graphs.

The plurality of subsystems further comprises an association validation subsystem configured to validate the determined one or more associations between the one or more datasets based on recurrent utilization of the determined one or more associations between the one or more datasets. The recurrent utilization of the determined one or more associations between the one or more datasets comprises an optimum weightage.

The plurality of subsystems further comprises a clustering subsystem configured to cluster the one or more datasets based on the validated one or more associations between the one or more datasets by detecting one or more dimensional models in the one or more weighted network graphs.

The plurality of subsystems further comprises an insight generation subsystem configured to generate one or more actionable insights on each of the clustered one or more datasets by performing at least one of: exploratory data analysis, influencer analytics, and forecasting of the one or more data.

The plurality of subsystems further comprises an output subsystem configured to output the generated one or more actionable insights on each of the clustered one or more datasets, to one or more user interfaces of one or more electronic devices associated with the one or more users.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
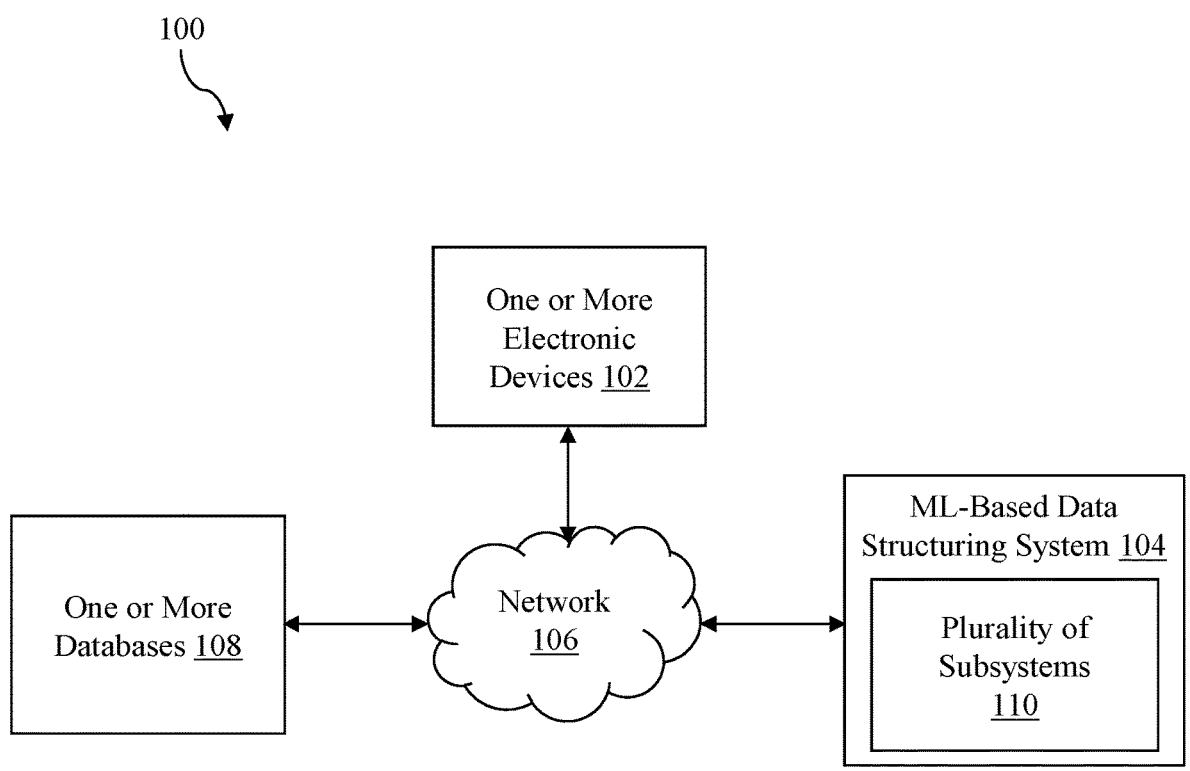
FIG. 1 is a block diagram illustrating a computing environment with a machine learning based (ML-based) data structuring system for automating a dimensional data modelling process in one or more data repositories, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 is a block diagram illustrating a computing environment 100 with a machine learning based (ML-based) data structuring system 104 for automating a dimensional data modelling process in one or more data repositories, in accordance with an embodiment of the present disclosure. According to FIG. 1, the computing environment 100 includes one or more electronic devices 102 that are communicatively coupled to the machine learning based (ML-based) data structuring system 104 through a network 106. The one or more electronic devices 102 may be associated with one or more users.

The present invention is configured to automatically build the dimensional data modelling process in one or more data repositories by combining one or more techniques including at least one of: database relationships, structured query language (SQL) logs, one or more inputs from the one or more electronic devices 102 associated with the one or more users, data analysis. The present invention is further configured to automatically update the ML-based data structuring system 104 if there are any structural changes to the one or more datasets. The ML-based data structuring system 104 is initially configured to obtain one or more datasets from one or more databases 108. In an embodiment, the one or more datasets may include the one or more data associated with one or more users. The one or more databases 108 may include the one or more datasets associated with the one or more users.

In an embodiment, the one or more users may include at least one of: one or more data analysts, one or more business analysts, one or more professionals in one or more organizations, and the like.

The ML-based data structuring system 104 is further configured to label the one or more data within the one or more datasets based on importance of the one or more data for analyzing the one or more datasets. The ML-based data structuring system 104 is further configured to classify the one or more data including one or more attributes and one or more measures, in the one or more datasets, based on one or more historical data associated with the one or more data using a machine-learning based classifier model (e.g., a Random Forrest Classifier model).

The ML-based data structuring system 104 is further configured to determine one or more associations between the one or more datasets based on at least one of: primary and foreign keys defined in one or more source databases, one or more structured query language (SQL) logs, usage of the one or more datasets in creating transformations in the machine learning based (ML-based) data structuring system 104, and performance of fuzzy string match of the one or more datasets. The ML-based data structuring system 104 is further configured to assign one or more weightages to the determined one or more associations between the one or more datasets based on utilization of the determined one or more associations between the one or more datasets using the one or more weighted network graphs.

The ML-based data structuring system 104 is further configured to validate the determined one or more associations between the one or more datasets based on recurrent utilization of the determined one or more associations between the one or more datasets. In an embodiment, the recurrent utilization of the determined one or more associations between the one or more datasets includes an optimum weightage. The ML-based data structuring system 104 is further configured to cluster the one or more datasets based on the validated one or more associations between the one or more datasets by detecting one or more dimensional models in the one or more weighted network graphs.

The ML-based data structuring system 104 is further configured to generate one or more actionable insights on each of the clustered one or more datasets by performing at least one of: exploratory data analysis, influencer analytics, and forecasting of the one or more data. The ML-based data structuring system 104 is further configured to output the generated one or more actionable insights on each of the clustered one or more datasets, to one or more user interfaces of the one or more electronic devices 102 associated with the one or more users.

The ML-based data structuring system 104 may be hosted on a central server including at least one of: a cloud server or a remote server. In an embodiment, the ML-based data structuring system 104 may include at least one of: a user device, a server computer, a server computer over the network 106, a cloud-based data structuring system, a cloud-based data structuring system over the network 106, a distributed data structuring system, and the like. Further, the network 106 may be at least one of: a Wireless-Fidelity (Wi-Fi) connection, a hotspot connection, a Bluetooth connection, a local area network (LAN), a wide area network (WAN), any other wireless network, and the like. In an embodiment, the one or more electronic devices 102 may include at least one of: a laptop computer, a desktop computer, a tablet computer, a Smartphone, a wearable device, a Smart watch, and the like.

Further, the computing environment 100 includes the one or more databases 108 communicatively coupled to the machine learning based (ML-based) data structuring system 104 through the network 106. In an embodiment, the one or more databases 108 include at least one of: one or more relational databases, one or more object-oriented databases, one or more data warehouses, one or more cloud-based databases, and the like. In another embodiment, a format of the one or more data retrieved from the one or more databases 108 may include at least one of: a comma-separated values (CSV) format, a JavaScript Object Notation (JSON) format, an Extensible Markup Language (XML), spreadsheets, and the like. Furthermore, the one or more electronic devices 102 include at least one of: a local browser, a mobile application, and the like.

Furthermore, the one or more users may use a web application through the local browser, the mobile application to communicate with the machine learning based (ML-based) data structuring system 104. In an embodiment of the present disclosure, the machine learning based (ML-based) data structuring system 104 includes a plurality of subsystems 110. Details on the plurality of subsystems 110 have been elaborated in subsequent paragraphs of the present description with reference to FIG. 2.

Figure 2:
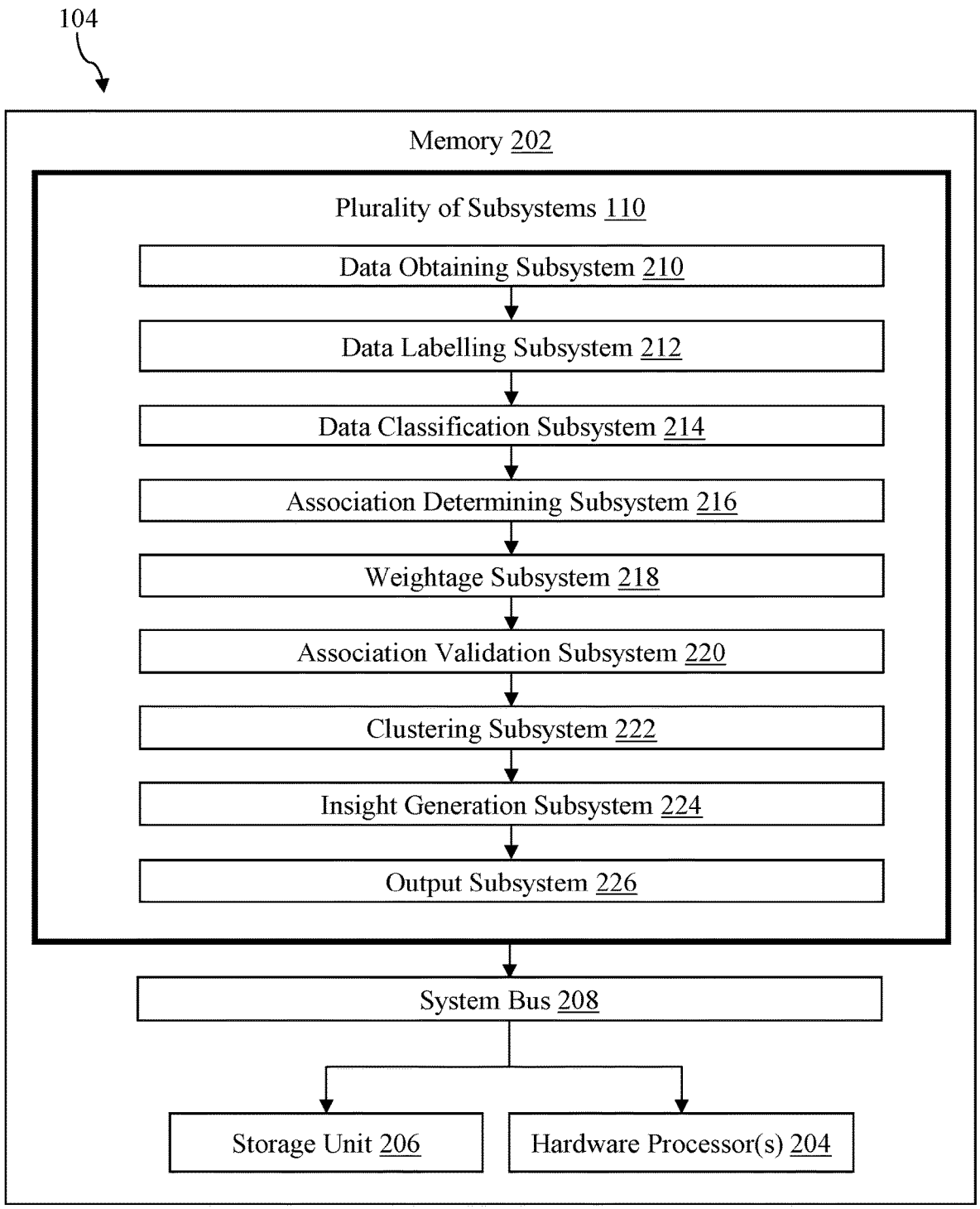
FIG. 2 is a detailed view of the machine learning based (ML-based) data structuring system for automating the dimensional data modelling process in the one or more data repositories, in accordance with another embodiment of the present disclosure.

FIG. 2 is a detailed view of the machine learning based (ML-based) data structuring system 104 for automating the dimensional data modelling process in the one or more data repositories, in accordance with another embodiment of the present disclosure. The machine learning based (ML-based) data structuring system 104 includes a memory 202, one or more hardware processors 204, and a storage unit 206. The memory 202, the one or more hardware processors 204, and the storage unit 206 are communicatively coupled through a system bus 208 or any similar mechanism. The memory 202 includes the plurality of subsystems 110 in the form of programmable instructions executable by the one or more hardware processors 204.

The plurality of subsystems 110 includes a data obtaining subsystem 210, a data labelling subsystem 212, a data classification subsystem 214, an association determining subsystem 216, a weightage subsystem 218, an association validation subsystem 220, a clustering subsystem 222, an insight generation subsystem 224, and an output subsystem 226.

The one or more hardware processors 204, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 204 may also include embedded controllers, including at least one of: generic or programmable logic devices or arrays, application specific integrated circuits, single-chip computers, and the like.

The memory 202 may be non-transitory volatile memory and non-volatile memory. The memory 202 may be coupled for communication with the one or more hardware processors 204, being a computer-readable storage medium. The one or more hardware processors 204 may execute machine-readable instructions and/or source code stored in the memory 202. A variety of machine-readable instructions may be stored in and accessed from the memory 202. The memory 202 may include any suitable elements for storing data and machine-readable instructions, including at least one of: read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes the plurality of subsystems 110 stored in the form of machine-readable instructions on any of the above-mentioned storage media and may be in communication with and executed by the one or more hardware processors 204.

The storage unit 206 may be a cloud storage, a Structured Query Language (SQL) data store, a noSQL database or a location on a file system directly accessible by the plurality of subsystems 110.

The plurality of subsystems 110 includes the data obtaining subsystem 210 that is communicatively connected to the one or more hardware processors 204. The data obtaining subsystem 210 is configured to obtain the one or more datasets from the one or more databases 108. The one or more datasets may include the one or more data associated with the one or more users. In an embodiment, the one or more users may include at least one of: the one or more data analysts, the one or more business analysts, the one or more professionals in the one or more organizations, and the like.

The plurality of subsystems 110 further includes the data labelling subsystem 212 that is communicatively connected to the one or more hardware processors 204. The data labelling subsystem 212 is configured to label the one or more data within the one or more datasets based on the importance of the one or more data for analyzing the one or more datasets. In other words, the data labelling subsystem 212 (i.e., important attributes and measures engine (IAME)) is configured to mark the one or more data (e.g., one or more columns) as important for analysis. The data labelling subsystem 212 is configured to utilize the machine-learning based classifier model (e.g., the Random Forest Classifier model) that is trained on one or more pre-classified historical data and data based on attribute importance, that are manually modified or validated by the one or more users.

The plurality of subsystems 110 further includes the data classification subsystem 214 that is communicatively connected to the one or more hardware processors 204. The data classification subsystem 214 is configured to classify the one or more data including one or more attributes and one or more measures, in the one or more datasets, based on one or more historical data associated with the one or more data using the machine-learning based classifier model. The machine-learning based classifier model may be a Random Forrest Classifier model that is trained on a continuous basis with the historical data available in the machine learning based (ML-based) data structuring system 104. In an embodiment, the machine-learning based classifier model may include at least one of: logistic regression model, k-nearest neighbors (KNN) algorithm, and the like.

In an embodiment, for classifying the one or more data including the one or more attributes and the one or more measures, in the one or more datasets, based on the one or more historical data using the machine-learning based classifier model, the data classification subsystem 214 is configured to obtain the one or more data including the one or more attributes and the one or more measures, from the one or more databases 108. The data classification subsystem 214 is further configured to compare the one or more data including the one or more attributes and the one or more measures, in the one or more datasets, with the one or more historical data associated with the one or more data. In an embodiment, the one or more historical data may include one or more pre-trained classified data associated with the one or more data. The data classification subsystem 214 is further configured to classify the one or more data including the one or more attributes and the one or more measures, in the one or more datasets, based on the comparison of the one or more data with the one or more historical data comprising the one or more pre-trained classified data.

In an embodiment, the machine-learning based classifier model is trained on the one or more historical data. For training the machine-learning based classifier model on the one or more historical data, the data classification subsystem 214 is configured to identify one or more variables required to determine the one or more data including the one or more attributes and the one or more measures, wherein the one or more variables comprise at least one of: type, uniqueness, and cardinality, of the one or more data.

The data classification subsystem 214 is further configured to provide the one or more historical data into the machine-learning based classifier model upon labelling the one or more historical data as the one or more attributes and the one or more measures. The data classification subsystem 214 is further configured to train the machine-learning based classifier model by adapting the machine-learning based classifier model to automatically define one or more rules on the identified one or more variables for labelling the one or more historical data as the one or more attributes and the one or more measures.

The data classification subsystem 214 is further configured to classify the one or more data including the one or more attributes and the one or more measures using the trained machine-learning based classifier model. In an embodiment, the machine-learning based classifier model is continuously trained with the one or more data where the one or more attributes and the one or more measures are manually modified or validated by the one or more users.

In an embodiment, the labelling of the one or more data is changed based on the importance of the one or more data by validating the labelling of the one or more data. The machine-learning based classifier model is configured to learn the changes in the labelling of the one or more data as one or more feedbacks received from the data labelling subsystem 212. The machine-learning based classifier model is further configured to classify the one or more data including the one or more attributes and the one or more measures, in the one or more datasets, based on the one or more feedbacks corresponding to the changes in the labelling of the one or more data.

The plurality of subsystems 110 further includes the association determining subsystem 216 that is communicatively connected to the one or more hardware processors 204. The association determining subsystem 216 (e.g., an association discovery engine (ADE) belonging to an association learning engine (ALE)) is configured to determine the one or more associations between the one or more datasets based on at least one of: the primary and foreign keys defined in the one or more source databases, the one or more structured query language (SQL) logs, the usage of the one or more datasets in creating transformations in the machine-learning based data structuring system 104, and performance of fuzzy string match of the one or more datasets.

In other words, the association determining subsystem 216 is configured to determine relationships or associations between the one or more datasets and type/cardinality of the relationships by at least one of: (a) detecting the primary and foreign key relationships defined in the one or more source databases, (b) detecting the relationships based on join conditions specified when the one or more datasets are queried by the one or more users, using the structured query language (SQL) logs that are read and parsed on a regular basis, (c) detecting the relationships based on the join conditions specified when the one or more datasets are used in creating transformations in the machine-learning based data structuring system 104 (e.g., insights application), and (d) performance of fuzzy string match of column names of different datasets and for the cases where the column names partially or completely match the underlying data are analysed and the relationships are determined. In an embodiment, multi-column relationships are also determined using the above mentioned methods.

The plurality of subsystems 110 further includes the weightage subsystem 218 that is communicatively connected to the one or more hardware processors 204. The weightage subsystem 218 is configured to assign the one or more weightages to the determined one or more associations between the one or more datasets based on the utilization of the determined one or more associations between the one or more datasets using the one or more weighted network graphs.

In an embodiment, for assigning the one or more weightages to the determined one or more associations between the one or more datasets, the weightage subsystem 218 is configured to store the determined one or more associations between the one or more datasets in the one or more weighted network graphs (e.g., Dataset Association Graph (DAG)). In an embodiment, the one or more weighted network graphs may include one or more pre-stored associations between the one or more datasets being assigned with one or more pre-stored weightages. The weightage subsystem 218 is further configured to correlate the determined one or more associations between the one or more datasets, with the one or more pre-stored associations being assigned with the one or more pre-stored weightages in the weighted network graphs. The weightage subsystem 218 is further configured to assign the one or more weightages to the determined one or more associations between the one or more datasets based on the correlation of the determined one or more associations between the one or more datasets, with the one or more pre-stored associations being assigned with the one or more pre-stored weightages in the weighted network graphs.

The plurality of subsystems 110 further includes the association validation subsystem 220 that is communicatively connected to the one or more hardware processors 204. The association validation subsystem 220 (e.g., an association recommendation engine (ARE)) is configured to validate/recommend the determined one or more associations between the one or more datasets based on recurrent utilization (i.e., frequent usage) of the determined one or more associations between the one or more datasets. In an embodiment, the recurrent utilization of the determined one or more associations between the one or more datasets may include an optimum weightage (i.e., higher weightage).

The plurality of subsystems 110 further includes the clustering subsystem 222 that is communicatively connected to the one or more hardware processors 204. The clustering subsystem 222 (e.g., an association based clustering engine (ACE)) is configured to cluster the one or more datasets based on the validated one or more associations between the one or more datasets by detecting one or more dimensional models in the one or more weighted network graphs. In other words, the clustering subsystem 222 is configured to form group of the one or more datasets that may be analyzed or visualized together. The group of the one or more datasets may be called as clusters. In an embodiment, the association based clustering engine may internally utilize the association recommendation engine to get the most validated associations between the one or more datasets.

In an embodiment, the one or more datasets are clustered based on the one or more dimensional models including at least one of: a star-schema dimensional model and a snowflaked-schema dimensional model, detected in the one or more weighted network graphs (e.g., the Dataset Association Graph (DAG)) and are called as simple clusters. In another embodiment, the one or more dimensional models involving multiple transactional datasets and common dimensional datasets of the multiple transactional datasets are also detected and created as superclusters.

The plurality of subsystems 110 further includes the insight generation subsystem 224 that is communicatively connected to the one or more hardware processors 204. The insight generation subsystem 224 (e.g., an actionable insights (AI) engine) is configured to generate the one or more actionable insights on each of the clustered one or more datasets by performing at least one of: the exploratory data analysis, the influencer analytics, and forecasting of the one or more data.

In an embodiment, the exploratory data analysis (EDA) refers to a method of studying and exploring the one or more datasets to at least one of: determine predominant traits of the one or more datasets, determine one or more patterns, locate outliers, identify relationships/associations between one or more variables, and provide factual and derived insights.

In an embodiment, the influencer analytics is a process of analyzing performance metrics to evaluate an impact of their influencers, thereby identifying one or more influence factors and a level of influence. The gained one or more insights may help the business focus on the one or more influencing factors to maximize the performance metrics.

The forecasting is a process of making predictions based on the one or more historical and present data. The forecasting of the one or more data may provide management with valuable insights into the way the business performed in the past and the way the business will perform in the future. The forecasting insights may help the business in making decisions about the future of the organization like formulating business plans, defining the expected sales goals, inventory levels, and the like.

The plurality of subsystems 110 further includes the output subsystem 226 that is communicatively connected to the one or more hardware processors 204. The output subsystem 226 is configured to output the generated one or more actionable insights on each of the clustered one or more datasets, to one or more user interfaces of the one or more electronic devices 102 associated with the one or more users.

Figure 3:
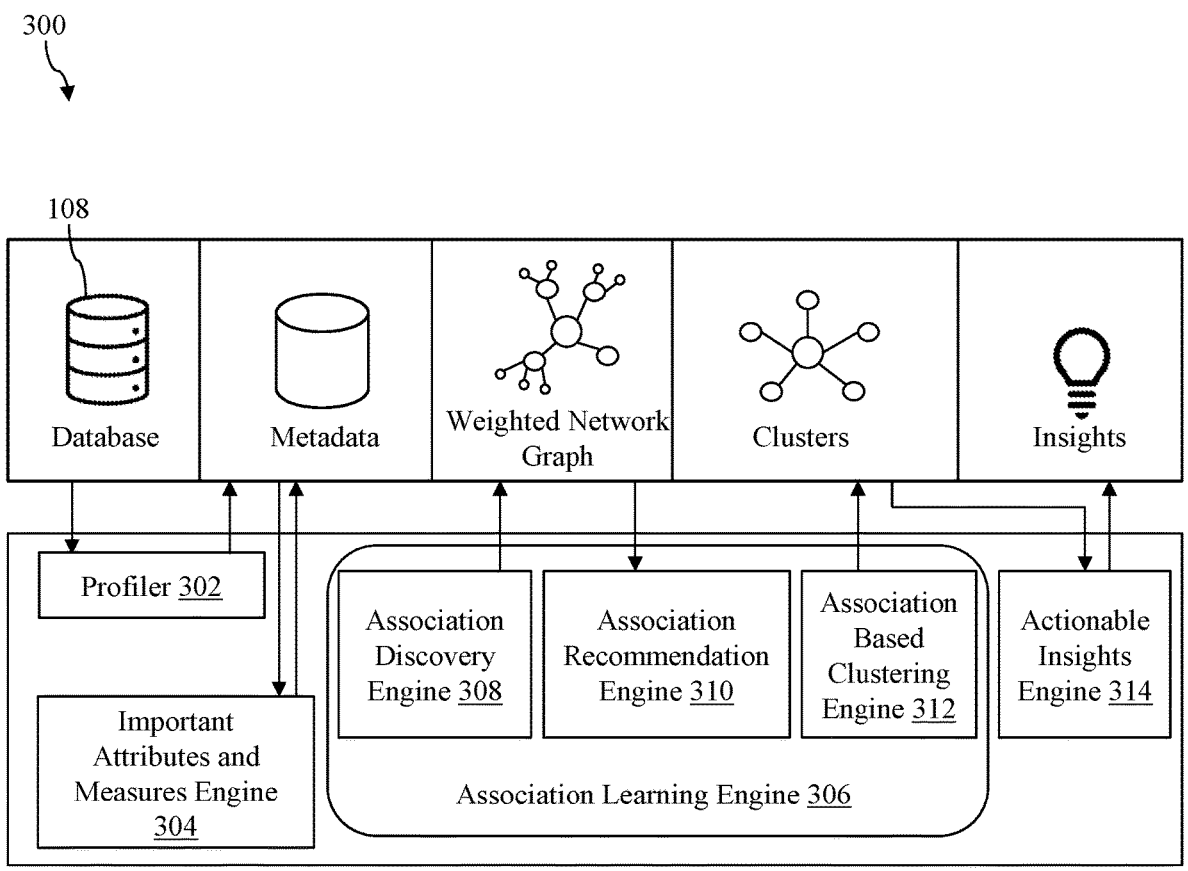
FIG. 3 is an exemplary block diagram of the machine learning based (ML-based) data structuring system for automating the dimensional data modelling process in the one or more data repositories, in accordance with an embodiment of the present disclosure.

FIG. 3 is an exemplary block diagram 300 of the machine learning based (ML-based) data structuring system 104 for automating the dimensional data modelling process in the one or more data repositories, in accordance with an embodiment of the present disclosure. The exemplary block diagram 300 includes a profiler 302 (i.e., the data obtaining subsystem 210 as shown in FIG. 2) that is configured to obtain the one or more datasets from the one or more databases 108. The exemplary block diagram 300 further includes the important attributes and measures engine (IAME) 304 (i.e., the data labelling subsystem 212 as shown in FIG. 2) that is is configured to mark the one or more data (e.g., the one or more columns) as important for analysis.

The exemplary block diagram 300 further includes the association learning engine 306 that includes at least one of: the association discovery engine 308, the association recommendation engine 310, the association based clustering engine 312. The association discovery engine 308 (i.e., the association determining subsystem 216 as shown in FIG. 2) is configured to determine the one or more associations between the one or more datasets based on at least one of: the primary and foreign keys defined in the one or more source databases, the one or more structured query language (SQL) logs, the usage of the one or more datasets in creating transformations in the machine-learning based data structuring system 104, and the performance of fuzzy string match of the one or more datasets.

The association recommendation engine 310 (i.e., the association validation subsystem 220) as shown in FIG. 2) is configured to validate/recommend the determined one or more associations between the one or more datasets based on the recurrent utilization of the determined one or more associations between the one or more datasets. The determined one or more associations between the one or more datasets are validated/recommended based on the optimum weightage assigned to the one or more associations between the one or more datasets.

The association based clustering engine 312 (i.e., the clustering subsystem 222 as shown in FIG. 2) is configured to cluster the one or more datasets based on the validated one or more associations between the one or more datasets by detecting the one or more dimensional models in the one or more weighted network graphs. The actionable insights engine 314 (i.e., the insight generation subsystem 224 as shown in FIG. 2) is configured to query the important columns (detected by TIAME) in each of the clusters, performs at least one of: the exploratory data analysis, the influencer analytics and forecasting to come up with quick actionable insights.

Figure 4:
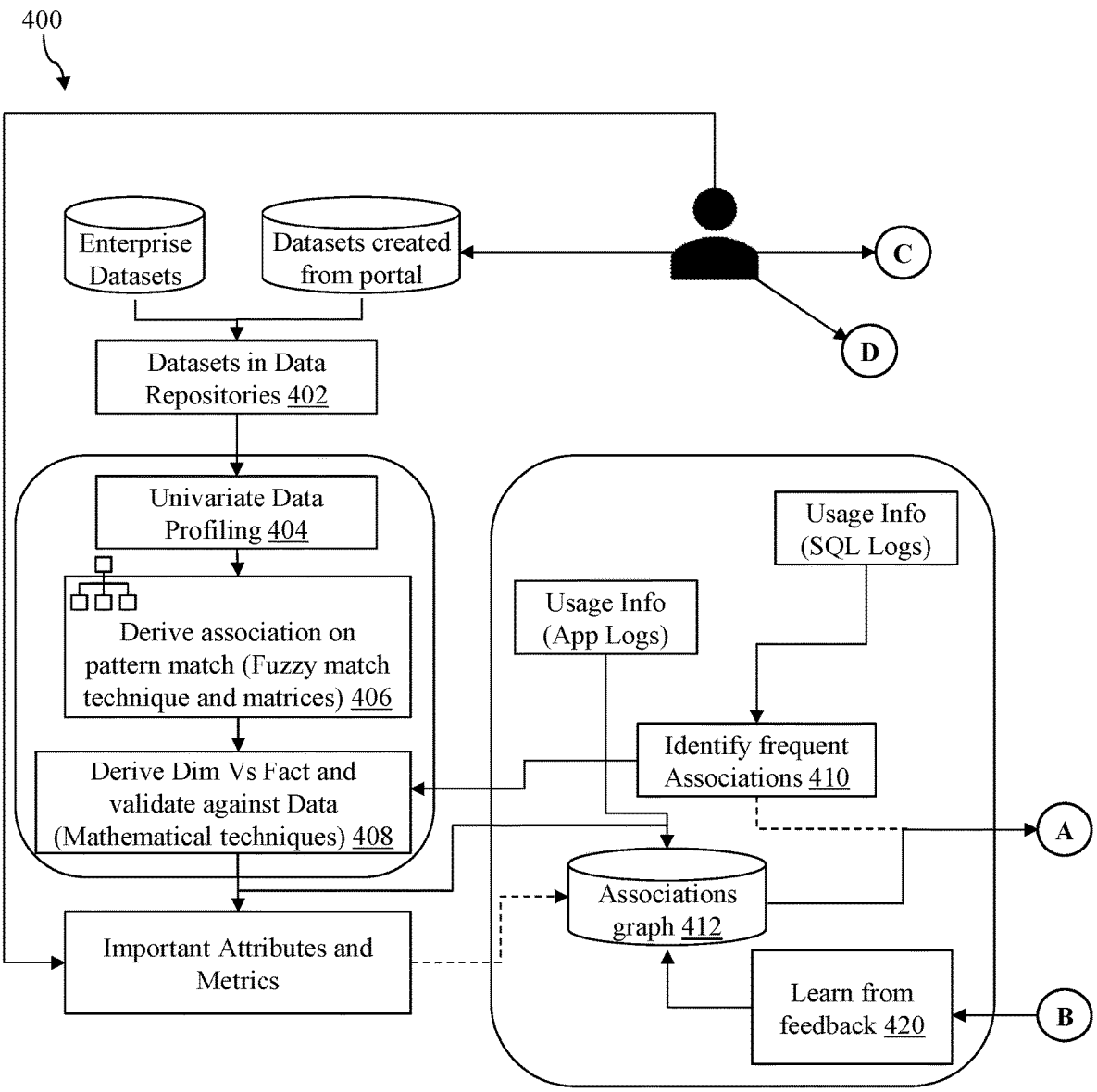
FIG. 4 is a process flow of the automated dimensional data modelling process for generating one or more actionable insights on one or more datasets, in accordance with an embodiment of the present disclosure.
Figure 4:
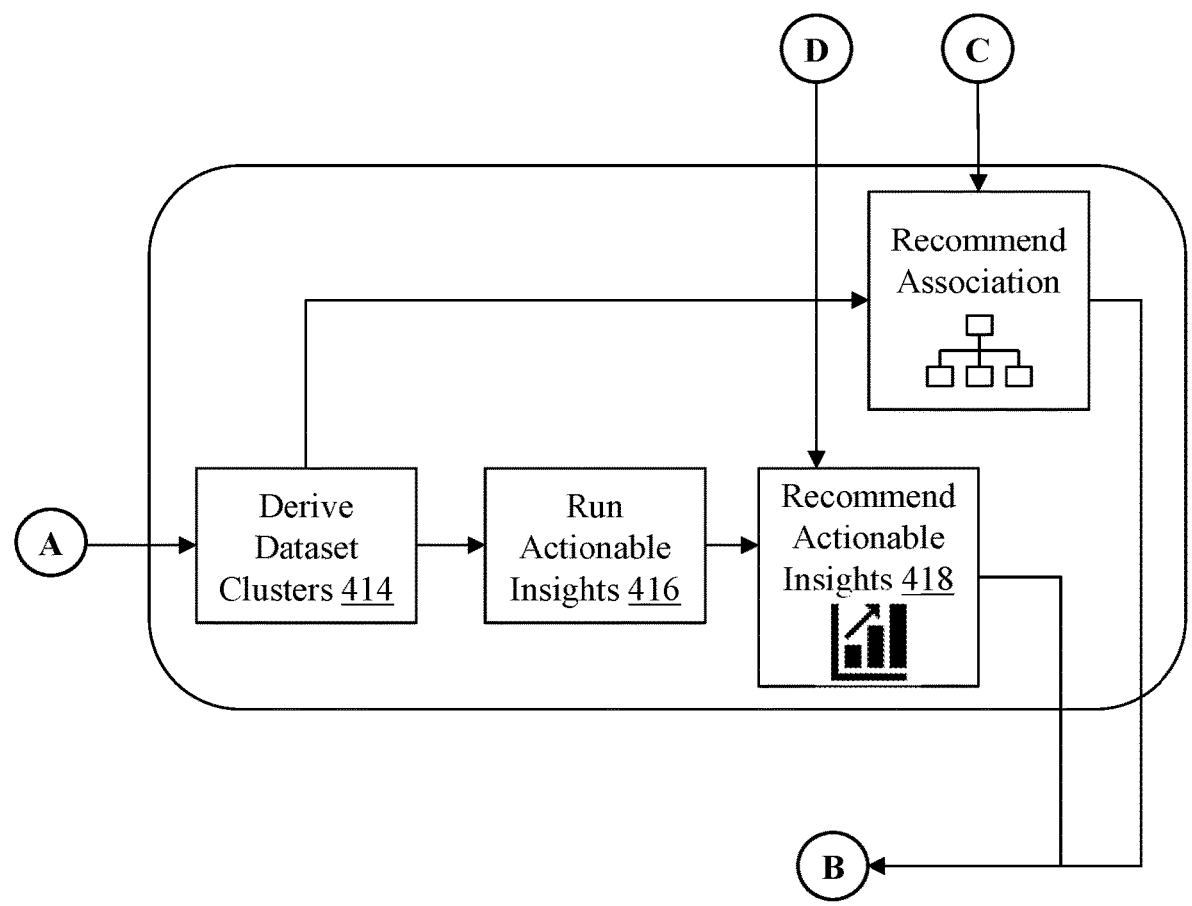

FIG. 4 is a process flow 400 of the automated dimensional data modelling process for generating the one or more actionable insights on the one or more datasets, in accordance with an embodiment of the present disclosure. At step 402, the one or more datasets are derived from at least one of: from one or more enterprises and created from one or more portals. At step 404, the one or more datasets are obtained from the one or more databases 108 using the profiler (i.e., univariate data profiling).

Further, the one or more associations between the one or more datasets are derived by deriving the association on pattern match including the fuzzy string match technique and matrices and data mathematical techniques, as shown in steps 406 and 408. Further, the recurrent utilization of the determined one or more associations between the one or more datasets, is identified to validate the determined one or more associations between the one or more datasets, as shown in step 410. The one or more datasets are clustered based on the validated one or more associations between the one or more datasets by detecting the one or more dimensional models in the one or more weighted network graphs, as shown in step 412. The dataset clusters are derived at step 414. Further, the actionable insights (AI) engine is configured to run the one or more actionable insights on each of the clustered one or more datasets and recommend the one or more actionable insights on each of the clustered one or more datasets, as shown in steps 416 and 418.

The machine-learning based classifier model is configured to learn the changes in the labelling of the one or more data as one or more feedbacks received from the data labelling subsystem 212 (as shown in step 420). The machine-learning based classifier model is further configured to classify the one or more data including the one or more attributes and the one or more measures, in the one or more datasets, based on the one or more feedbacks corresponding to the changes in the labelling of the one or more data. In FIG. 4, the circular symbol with "A" written inside is being used as an off-page connector. This is used for indicating that FIG. 4 continues in the next page.

Figure 5:
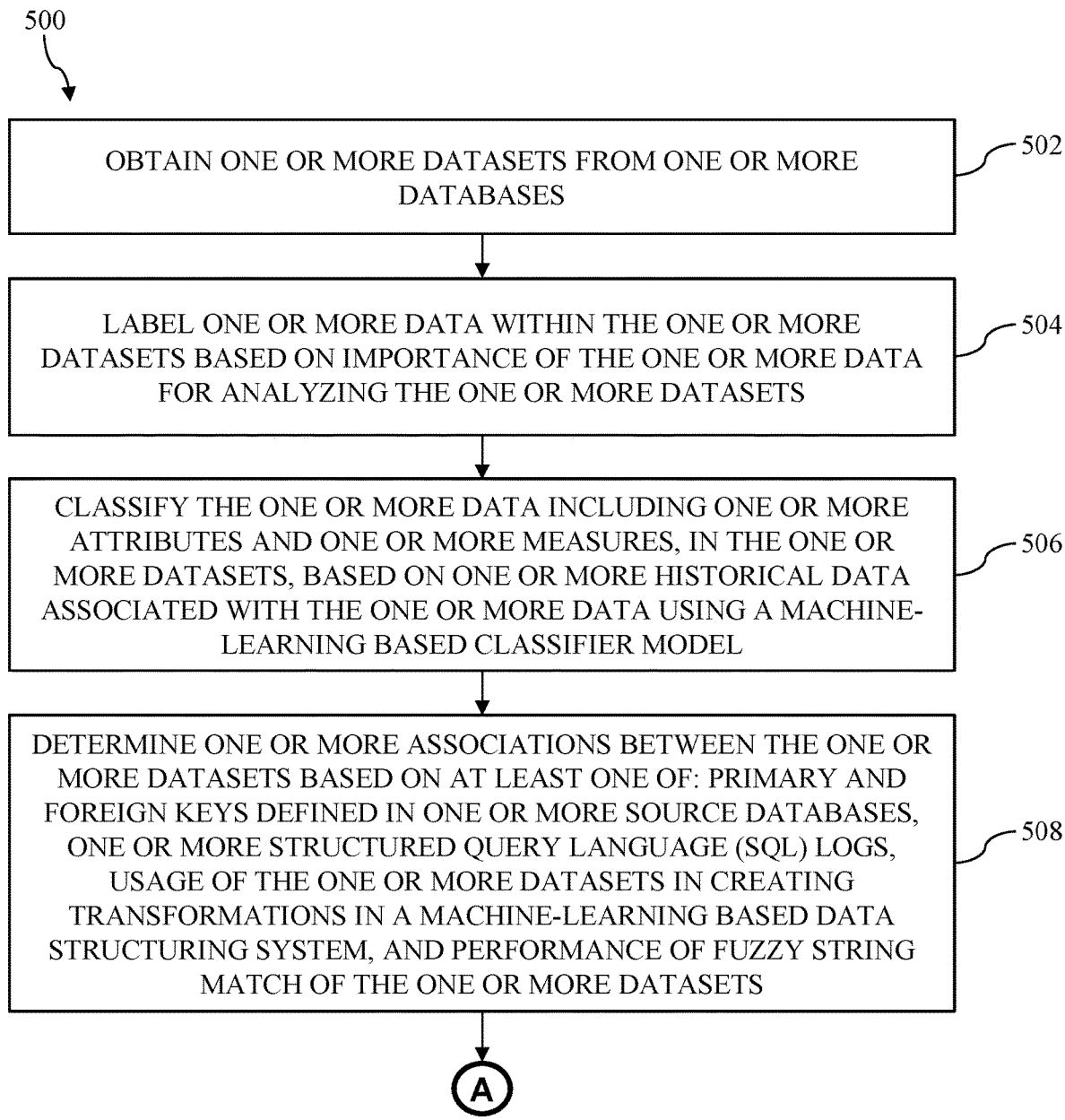
FIG. 5 is a flow chart illustrating a machine learning based (ML-based) data structuring method for automating the dimensional data modelling process in the one or more data repositories, in accordance with an embodiment of the present disclosure.
Figure 5:
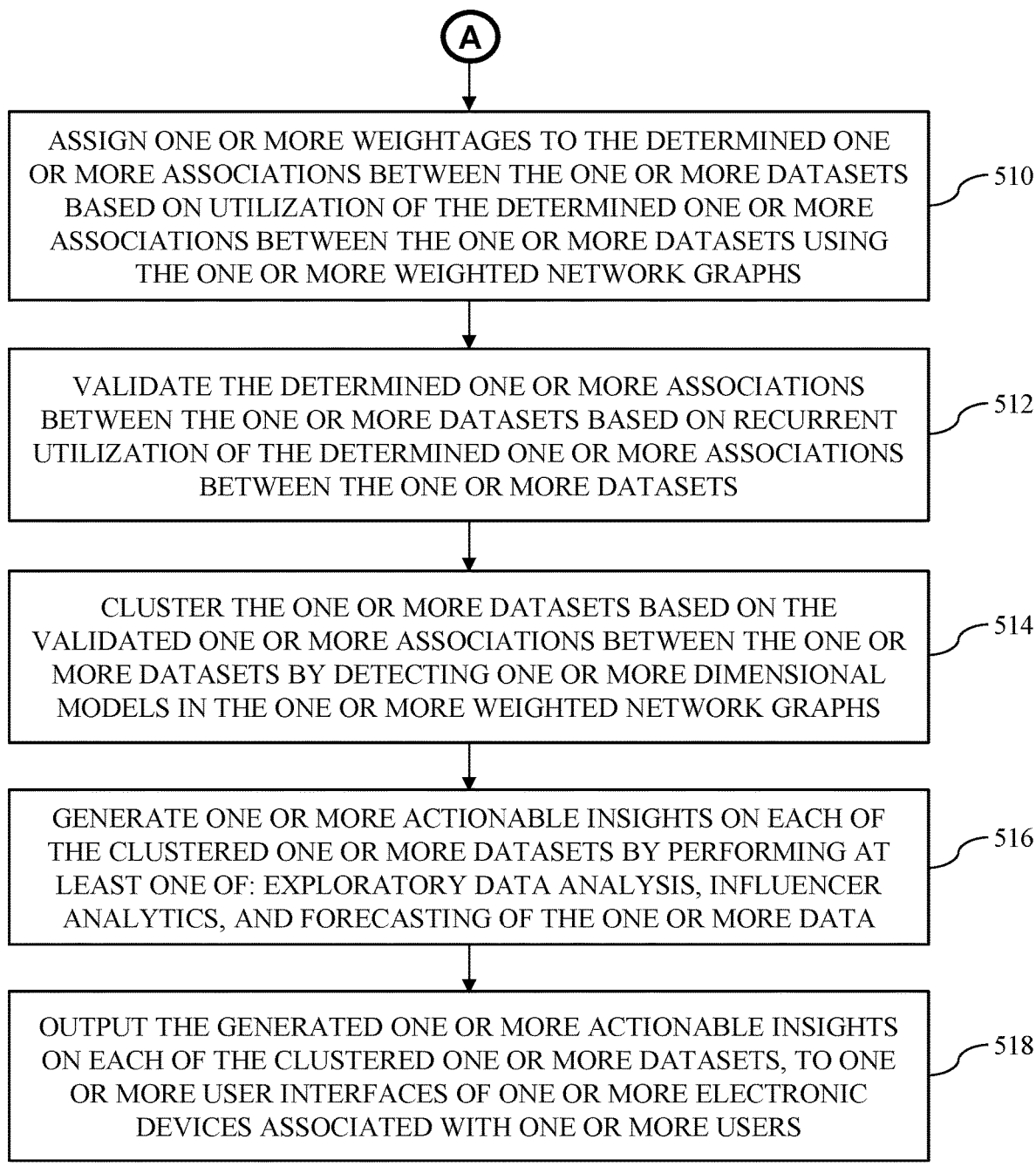

FIG. 5 is a flow chart illustrating a machine learning based (ML-based) data structuring method 500 for automating the dimensional data modelling process in the one or more data repositories, in accordance with an embodiment of the present disclosure. At step 502, the one or more datasets are obtained from the one or more databases 108. In an embodiment, the one or more datasets may include the one or more data associated with the one or more users.

At step 504, the one or more data (e.g., the one or more columns) within the one or more datasets are labelled based on the importance of the one or more data for analyzing the one or more datasets.

At step 506, the one or more data including the one or more attributes and the one or more measures, in the one or more datasets, are classified based on the one or more historical data associated with the one or more data using the machine-learning based classifier model.

At step 508, the one or more associations between the one or more datasets are determined based on at least one of: the primary and foreign keys defined in the one or more source databases, the one or more structured query language (SQL) logs, the usage of the one or more datasets in creating transformations in the machine-learning based data structuring system 104, and the performance of the fuzzy string match of the one or more datasets.

At step 510, the one or more weightages are assigned to the determined one or more associations between the one or more datasets based on utilization of the determined one or more associations between the one or more datasets using the one or more weighted network graphs.

At step 512, the determined one or more associations between the one or more datasets are validated based on the recurrent utilization of the determined one or more associations between the one or more datasets. The recurrent utilization of the determined one or more associations between the one or more datasets may include the optimum weightage.

At step 514, the one or more datasets are clustered based on the validated one or more associations between the one or more datasets by detecting the one or more dimensional models in the one or more weighted network graphs.

At step 516, the one or more actionable insights are generated on each of the clustered one or more datasets by performing at least one of: the exploratory data analysis, the influencer analytics, and forecasting of the one or more data.

At step 518, the generated one or more actionable insights on each of the clustered one or more datasets, are outputted to the one or more user interfaces of the one or more electronic devices 102 associated with the one or more users. In FIG. 5, the circular symbol with "A" written inside is being used as an off-page connector. This is used for indicating that FIG. 5 continues in the next page.

The present invention has following advantages. The present invention with the ML-based data structuring system 104 is configured to automate the dimensional data modelling process in the data repositories. The dimensional data modeling is a crucial and time consuming step in building a data warehouse or a data lake. The present invention with the ML-based data structuring system 104 is further configured to eliminate the manual effort required in developing the dimensional data model, thereby saving time and cost in structuring the one or more data in the one or more datasets. The present invention with the ML-based data structuring system 104 is further configured to automatically update the data structures and adds new datasets where a proper relationship exists.

The present invention with the ML-based data structuring system 104 is further configured to automate a manual time-consuming process of developing a dimensional data model. The present invention with the ML-based data structuring system 104 is further configured to automatically maintain the dimensional data models in accordance with changes made to the one or more data repositories.

The present invention with the ML-based data structuring system 104 is further configured to automatically determine the one or more associations between the one or more datasets that are usually defined by the one or more users (e.g., an IT team). The ML-based data structuring system 104 is capable of providing information associated with the one or more associations to the one or more users when the one or more users may not be aware of the one or more associations between the one or more datasets. The present invention with the ML-based data structuring system 104 is further configured to automatically generate and maintain all possible dimensional data models being ready to be used for all the time so that any new reporting or data analysis requirement may be addressed immediately without waiting for the dimensional data model to be generated.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the machine learning based (ML-based) data structuring system 104 either directly or through intervening I/O controllers. Network adapters may also be coupled to the machine learning based (ML-based) data structuring system 104 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/machine learning based (ML-based) data structuring system 104 in accordance with the embodiments herein. The machine learning based (ML-based) data structuring system 104 herein comprises at least one processor or central processing unit (CPU). The CPUs are interconnected via the system bus 208 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the machine learning based (ML-based) data structuring system 104. The machine learning based (ML-based) data structuring system 104 can read the inventive instructions on the program storage devices and follow these instructions to execute the methodology of the embodiments herein.

The machine learning based (ML-based) data structuring system 104 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

What is claimed is:

1. A machine learning-based (ML-based) data structuring method for automating a dimensional data modelling process in one or more data repositories, the machine learning-based (ML-based) data structuring method comprising:
    obtaining, by one or more hardware processors, one or more datasets from one or more databases, wherein the one or more datasets comprise the one or more data associated with one or more users;
    labelling, by the one or more hardware processors, the one or more data within the one or more datasets based on importance of the one or more data for analyzing the one or more datasets;
    classifying, by the one or more hardware processors, the one or more data comprising one or more attributes and one or more measures, in the one or more datasets, based on one or more historical data associated with the one or more data using a machine-learning based classifier model;
    determining, by the one or more hardware processors, one or more associations between the one or more datasets based on at least one of: primary and foreign keys defined in one or more source databases, one or more structured query language (SQL) logs, usage of the one or more datasets in creating transformations in a machine-learning based data structuring system, and performance of fuzzy string match of the one or more datasets;
    assigning, by the one or more hardware processors, one or more weightages to the determined one or more associations between the one or more datasets based on utilization of the determined one or more associations between the one or more datasets using one or more weighted network graphs;
    validating, by the one or more hardware processors, the determined one or more associations between the one or more datasets based on recurrent utilization of the determined one or more associations between the one or more datasets, wherein the recurrent utilization of the determined one or more associations between the one or more datasets comprises an optimum weightage;
    clustering, by the one or more hardware processors, the one or more datasets based on the validated one or more associations between the one or more datasets by detecting one or more dimensional models in the one or more weighted network graphs;
    generating, by the one or more hardware processors, one or more actionable insights on each of the clustered one or more datasets by performing at least one of: exploratory data analysis, influencer analytics, and forecasting of the one or more data; and
    outputting, by the one or more hardware processors, the generated one or more actionable insights on each of the clustered one or more datasets, to one or more user interfaces of one or more electronic devices associated with the one or more users.

2. The machine learning-based (ML-based) data structuring method of claim 1, wherein classifying, by the machine-learning based classifier model, the one or more data comprising the one or more attributes and the one or more measures, in the one or more datasets, based on the one or more historical data, comprises:
    obtaining, by the one or more hardware processors, the one or more data comprising the one or more attributes and the one or more measures, from the one or more databases;
    comparing, by the one or more hardware processors, the one or more data comprising the one or more attributes and the one or more measures, in the one or more datasets, with the one or more historical data associated with the one or more data, wherein the one or more historical data comprise one or more pre-trained classified data associated with the one or more data; and
    classifying, by the one or more hardware processors, the one or more data comprising the one or more attributes and the one or more measures, in the one or more datasets, based on the comparison of the one or more data with the one or more historical data comprising the one or more pre-trained classified data.

3. The machine learning-based (ML-based) data structuring method of claim 2, further comprising training, by the one or more hardware processors, the machine-learning based classifier model on the one or more historical data, wherein training the machine-learning based classifier model on the one or more historical data comprises:
    identifying, by the one or more hardware processors, one or more variables required to determine the one or more data comprising the one or more attributes and the one or more measures, wherein the one or more variables comprise at least one of: type, uniqueness, and cardinality, of the one or more data;
    providing, by the one or more hardware processors, the one or more historical data into the machine-learning based classifier model upon labelling the one or more historical data as the one or more attributes and the one or more measures;
    training, by the one or more hardware processors, the machine-learning based classifier model by adapting the machine-learning based classifier model to automatically define one or more rules on the identified one or more variables for labelling the one or more historical data as the one or more attributes and the one or more measures; and classifying, by the one or more hardware processors, the one or more data comprising the one or more attributes and the one or more measures using the trained machine-learning based classifier model.

4. The machine learning-based (ML-based) data structuring method of claim 1, wherein assigning the one or more weightages to the determined one or more associations between the one or more datasets, comprises:

storing, by the one or more hardware processors, the determined one or more associations between the one or more datasets in the one or more weighted network graphs, wherein the one or more weighted network graphs comprise one or more pre-stored associations between the one or more datasets being assigned with one or more pre-stored weightages;

correlating, by the one or more hardware processors, the determined one or more associations between the one or more datasets, with the one or more pre-stored associations being assigned with the one or more pre-stored weightages in the weighted network graphs; and assigning, by the one or more hardware processors, the one or more weightages to the determined one or more associations between the one or more datasets based on the correlation of the determined one or more associations between the one or more datasets, with the one or more pre-stored associations being assigned with the one or more pre-stored weightages in the weighted network graphs.

5. The machine learning-based (ML-based) data structuring method of claim 1, wherein the one or more datasets are clustered based on the one or more dimensional models comprising at least one of: star-schema dimensional model and snow-flaked-schema dimensional model, detected in the one or more pre-stored weightages.

6. The machine learning-based (ML-based) data structuring method of claim 1, wherein the labelling of the one or more data is changed based on the importance of the one or more data by validating the labelling of the one or more data.

7. The machine learning-based (ML-based) data structuring method of claim 6, further comprising:

learning, by the machine-learning based classifier model, the changes in the labelling of the one or more data as one or more feedbacks received from a data labelling subsystem; and classifying, by the machine-learning based classifier model, the one or more data comprising the one or more attributes and the one or more measures, in the one or more datasets, based on the one or more feedbacks corresponding to the changes in the labelling of the one or more data.

8. A machine learning-based (ML-based) data structuring system for automating a dimensional data modelling process in one or more data repositories, the machine learning-based (ML-based) data structuring system comprising:

one or more hardware processors;

a memory coupled to the one or more hardware processors, wherein the memory comprises a plurality of subsystems in form of programmable instructions executable by the one or more hardware processors, and wherein the plurality of subsystems comprises:

a data obtaining subsystem configured to obtain one or more datasets from one or more databases, wherein the one or more datasets comprise one or more data associated with one or more users;

a data labelling subsystem configured to label the one or more data within the one or more datasets based on importance of the one or more data for analyzing the one or more datasets;

a data classification subsystem configured to classify the one or more data comprising one or more attributes and one or more measures, in the one or more datasets, based on one or more historical data associated with the one or more data using a machine-learning based classifier model;

an association determining subsystem configured to determine one or more associations between the one or more datasets based on at least one of: primary and foreign keys defined in one or more source databases, one or more structured query language (SQL) logs, usage of the one or more datasets in creating transformations in a machine-learning based data structuring system, and performance of fuzzy string match of the one or more datasets;

a weightage subsystem configured to assign one or more weightages to the determined one or more associations between the one or more datasets based on utilization of the determined one or more associations between the one or more datasets using one or more weighted network graphs;

an association validation subsystem configured to validate the determined one or more associations between the one or more datasets based on recurrent utilization of the determined one or more associations between the one or more datasets, wherein the recurrent utilization of the determined one or more associations between the one or more datasets comprises an optimum weightage;

a clustering subsystem configured to cluster the one or more datasets based on the validated one or more associations between the one or more datasets by detecting one or more dimensional models in the one or more weighted network graphs;

an insight generation subsystem configured to generate one or more actionable insights on each of the clustered one or more datasets by performing at least one of: exploratory data analysis, influencer analytics, and forecasting of the one or more data; and an output subsystem configured to output the generated one or more actionable insights on each of the clustered one or more datasets, to one or more user interfaces of one or more electronic devices associated with the one or more users.

9. The machine learning-based (ML-based) data structuring system of claim 8, wherein in classifying, by the machine-learning based classifier model, the one or more data comprising the one or more attributes and the one or more measures, in the one or more datasets, based on the one or more historical data, the data classification subsystem is configured to:

obtain the one or more data comprising the one or more attributes and the one or more measures, from the one or more databases;

compare the one or more data comprising the one or more attributes and the one or more measures, in the one or more datasets, with the one or more historical data associated with the one or more data, wherein the one or more historical data comprise one or more pre-trained classified data associated with the one or more data; and classify the one or more data comprising the one or more attributes and the one or more measures, in the one or more datasets, based on the comparison of the one or more data with the one or more historical data comprising the one or more pre-trained classified data.

10. The machine learning-based (ML-based) data structuring system of claim 9, wherein the machine-learning based classifier model is trained on the one or more historical data, wherein in training the machine-learning based classifier model on the one or more historical data, the data classification subsystem is configured to:
  identify one or more variables required to determine the one or more data comprising the one or more attributes and the one or more measures, wherein the one or more variables comprise at least one of: type, uniqueness, and cardinality, of the one or more data;
  provide the one or more historical data into the machine-learning based classifier model upon labelling the one or more historical data as the one or more attributes and the one or more measures;
  train the machine-learning based classifier model by adapting the machine-learning based classifier model to automatically define one or more rules on the identified one or more variables for labelling the one or more historical data as the one or more attributes and the one or more measures; and
  classify the one or more data comprising the one or more attributes and the one or more measures using the trained machine-learning based classifier model.

11. The machine learning-based (ML-based) data structuring system of claim 8, wherein in assigning the one or more weightages to the determined one or more associations between the one or more datasets, the weightage subsystem is configured to:
  store the determined one or more associations between the one or more datasets in the one or more weighted network graphs, wherein the one or more weighted network graphs comprise one or more pre-stored associations between the one or more datasets being assigned with one or more pre-stored weightages;
  correlate the determined one or more associations between the one or more datasets, with the one or more pre-stored associations being assigned with the one or more pre-stored weightages in the weighted network graphs; and
  assign the one or more weightages to the determined one or more associations between the one or more datasets based on the correlation of the determined one or more associations between the one or more datasets, with the one or more pre-stored associations being assigned with the one or more pre-stored weightages in the weighted network graphs.

12. The machine learning-based (ML-based) data structuring system of claim 8, wherein the one or more datasets are clustered based on the one or more dimensional models comprising at least one of: star-schema dimensional model and snow-flaked-schema dimensional model, detected in the one or more pre-stored weightages.

13. The machine learning-based (ML-based) data structuring system of claim 8, wherein the labelling of the one or more data is changed based on the importance of the one or more data by validating the labelling of the one or more data.

14. The machine learning-based (ML-based) data structuring system of claim 13, wherein the machine-learning based classifier model is configured to:
  learn the changes in the labelling of the one or more data as one or more feedbacks received from a data labelling subsystem; and
  classify the one or more data comprising the one or more attributes and the one or more measures, in the one or more datasets, based on the one or more feedbacks corresponding to the changes in the labelling of the one or more data.

15. A non-transitory computer-readable storage medium having instructions stored therein that when executed by one or more hardware processors, cause the one or more hardware processors to execute operations of:
  obtaining one or more datasets from one or more databases, wherein the one or more datasets comprise the one or more data associated with one or more users;
  labelling the one or more data within the one or more datasets based on importance of the one or more data for analyzing the one or more datasets;
  classifying the one or more data comprising one or more attributes and one or more measures, in the one or more datasets, based on one or more historical data associated with the one or more data using a machine-learning based classifier model;
  determining one or more associations between the one or more datasets based on at least one of: primary and foreign keys defined in one or more source databases, one or more structured query language (SQL) logs, usage of the one or more datasets in creating transformations in a machine-learning based data structuring system, and performance of fuzzy string match of the one or more datasets;
  assigning one or more weightages to the determined one or more associations between the one or more datasets based on utilization of the determined one or more associations between the one or more datasets using one or more weighted network graphs;
  validating the determined one or more associations between the one or more datasets based on recurrent utilization of the determined one or more associations between the one or more datasets, wherein the recurrent utilization of the determined one or more associations between the one or more datasets comprises an optimum weightage;
  clustering the one or more datasets based on the validated one or more associations between the one or more datasets by detecting one or more dimensional models in the one or more weighted network graphs;
  generating one or more actionable insights on each of the clustered one or more datasets by performing at least one of: exploratory data analysis, influencer analytics, and forecasting of the one or more data; and
  outputting the generated one or more actionable insights on each of the clustered one or more datasets, to one or more user interfaces of one or more electronic devices associated with the one or more users.

16. The non-transitory computer-readable storage medium of claim 15, wherein classifying, by the machine-learning based classifier model, the one or more data comprising the one or more attributes and the one or more measures, in the one or more datasets, based on the one or more historical data, comprises:
  obtaining the one or more data comprising the one or more attributes and the one or more measures, from the one or more databases;
  comparing the one or more data comprising the one or more attributes and the one or more measures, in the one or more datasets, with the one or more historical data associated with the one or more data, wherein the one or more historical data comprise one or more pre-trained classified data associated with the one or more data; and classifying the one or more data comprising the one or more attributes and the one or more measures, in the one or more datasets, based on the comparison of the one or more data with the one or more historical data comprising the one or more pre-trained classified data.

17. The non-transitory computer-readable storage medium of claim 16, further comprising training the machine-learning based classifier model on the one or more historical data, wherein training the machine-learning based classifier model on the one or more historical data comprises:

identifying one or more variables required to determine the one or more data comprising the one or more attributes and the one or more measures, wherein the one or more variables comprise at least one of: type, uniqueness, and cardinality, of the one or more data;

providing the one or more historical data into the machine-learning based classifier model upon labelling the one or more historical data as the one or more attributes and the one or more measures; and training the machine-learning based classifier model by adapting the machine-learning based classifier model to automatically define one or more rules on the identified one or more variables for labelling the one or more historical data as the one or more attributes and the one or more measures.

18. The non-transitory computer-readable storage medium of claim 15, wherein assigning the one or more weightages to the determined one or more associations between the one or more datasets, comprises:

storing the determined one or more associations between the one or more datasets in the one or more weighted network graphs, wherein the one or more weighted network graphs comprise one or more pre-stored associations between the one or more datasets being assigned with one or more pre-stored weightages;

correlating the determined one or more associations between the one or more datasets, with the one or more pre-stored associations being assigned with the one or more pre-stored weightages in the weighted network graphs; and assigning the one or more weightages to the determined one or more associations between the one or more datasets based on the correlation of the determined one or more associations between the one or more datasets, with the one or more pre-stored associations being assigned with the one or more pre-stored weightages in the weighted network graphs, wherein the one or more datasets are clustered based on the one or more dimensional models comprising at least one of: star-schema dimensional model and snowflaked-schema dimensional model, detected in the one or more pre-stored weightages.

19. The non-transitory computer-readable storage medium of claim 15, wherein the labelling of the one or more data is changed based on the importance of the one or more data by validating the labelling of the one or more data.

20. The non-transitory computer-readable storage medium of claim 19, further comprising:

learning, by the machine-learning based classifier model, the changes in the labelling of the one or more data as one or more feedbacks received from a data labelling subsystem; and classifying, by the machine-learning based classifier model, the one or more data comprising the one or more attributes and the one or more measures, in the one or more datasets, based on the one or more feedbacks corresponding to the changes in the labelling of the one or more data.

* * * * *